United States Patent
Swanson

(10) Patent No.: US 9,146,005 B1
(45) Date of Patent: Sep. 29, 2015

(54) PORTABLE MEDIA EQUIPMENT SUPPORT DEVICE WITH ROTATING ACTION

(71) Applicant: Benjamin Alexander Swanson, Rancho Palos Verdes, CA (US)

(72) Inventor: Benjamin Alexander Swanson, Rancho Palos Verdes, CA (US)

( * ) Notice: Subject to any disclaimer, the term of this patent is extended or adjusted under 35 U.S.C. 154(b) by 0 days.

(21) Appl. No.: 14/166,849

(22) Filed: Jan. 28, 2014

Related U.S. Application Data

(60) Provisional application No. 61/757,338, filed on Jan. 28, 2013.

(51) Int. Cl.
*F16M 13/00* (2006.01)
*F16M 13/04* (2006.01)
*E04G 3/00* (2006.01)
*A47H 1/10* (2006.01)
*G03B 17/00* (2006.01)

(52) U.S. Cl.
CPC ............... *F16M 13/04* (2013.01); *F16M 13/00* (2013.01)

(58) Field of Classification Search
CPC ....... G03B 17/561; G03B 17/04; F16M 13/00
USPC ..................... 248/187.1, 183.1, 183.4, 186.1; 396/419, 428; 348/373
See application file for complete search history.

(56) References Cited

U.S. PATENT DOCUMENTS

| | | | | |
|---|---|---|---|---|
| 1,448,791 A * | 3/1923 | Coffeen | | 362/422 |
| 3,782,671 A * | 1/1974 | Igwe | | 248/183.4 |
| 4,474,089 A * | 10/1984 | Scott | | 81/57.29 |
| 4,530,580 A * | 7/1985 | Ueda et al. | | 396/425 |
| 4,680,994 A * | 7/1987 | Singleton | | 81/57.29 |
| 5,325,281 A * | 6/1994 | Harwood | | 362/271 |
| 6,293,172 B1 * | 9/2001 | Smith | | 81/57.13 |
| 6,923,542 B2 * | 8/2005 | Harris | | 352/243 |
| 7,684,694 B2 * | 3/2010 | Fromm | | 396/376 |
| 7,931,412 B2 * | 4/2011 | Brown | | 396/421 |
| 8,024,995 B2 * | 9/2011 | Dayton et al. | | 81/52 |
| 2008/0187308 A1 * | 8/2008 | Hannan | | 396/425 |

\* cited by examiner

*Primary Examiner* — Jonathan Liu
*Assistant Examiner* — Taylor Morris

(57) ABSTRACT

One embodiment of a portable media equipment support device comprising a hollow shaft having a first shaft end and a second shaft end. A manually rotatable handle is operatively mounted relative to the first shaft end and a mounting device rotational actuator is operatively mounted to the second shaft end. The manually rotatable handle is connected to mounting device rotational actuator by a drive rod internally running through said hollow shaft. A bevel gear system is internally located in said rotational actuator and used to translate motion approximately 90 degrees into a media mounting device. The media mounting device is used to secure and carry a media equipment element. The rotatable handle serves to control the motion of the drive rod and is thereby translated by the bevel gear system. This sequence of mechanical reactions is used to facilitate at least one of the panning or tilting motions of the media equipment. A locking screw connected to the head unit of the mounting device rotational actuator serves to secure the bevel gear system from rotation. Thereby allowing for said media equipment to be secured in a locked position, if desired. Other embodiments are described and shown.

4 Claims, 14 Drawing Sheets

Complete collapased Shaft and Assembly

1. L-Bracket
2. Telescoping Shaft
3. Shaft Clamp Lock
4. Rubber Grip
5. Head Unit
6. Small Bevel Gear
7. Large Bevel Gear
8. Telescoping inner drive rods.

Collapsed assembly with out head unit and telescoping shaft

Fig. 1a  Shaft and Assembly
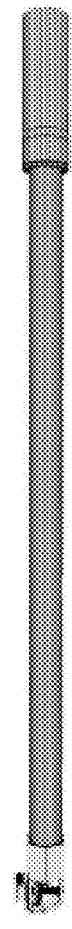
Fig. 1b  Complete Assembly With Mount
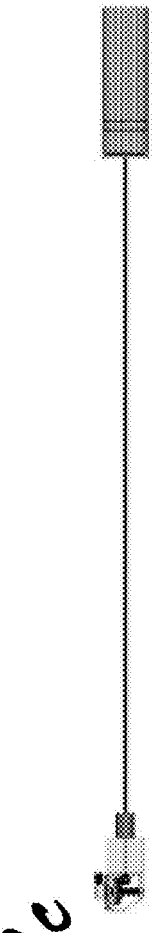
Fig. 1c  Complete Assembly Without Mount
Assembly showing Drive rod 1 Adjustable resistance Handle
2a Male Screw (attaches to shaft)
2b. resistance adjusting screw (female to 2a) and O-Ring housing
2c. O-Ring
3a. Handle rotator 1
3b. Handle rotator stopper (prevents handle and grip from moving l laterally along shaft, but allows rotation)
3c. Handle rotator 2
3d. Grip sleeve (slides over 3a,3b, and 3c) attaches to 3a and 3c
4a. Drive rod connector and handle end cap (attaches to 3d)
4b. Shaft inner cap and drive rod guide
4c. Shaft Boom
4d. Drive Rod

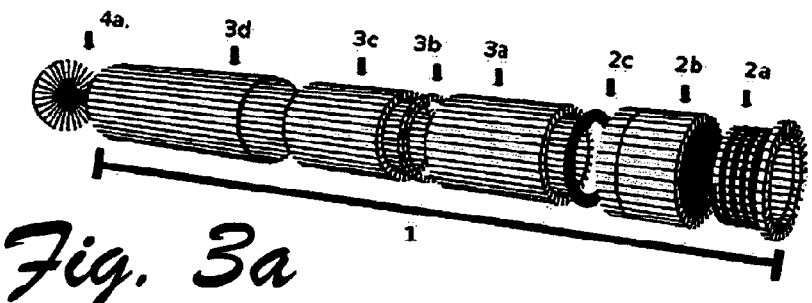

Fig. 3a

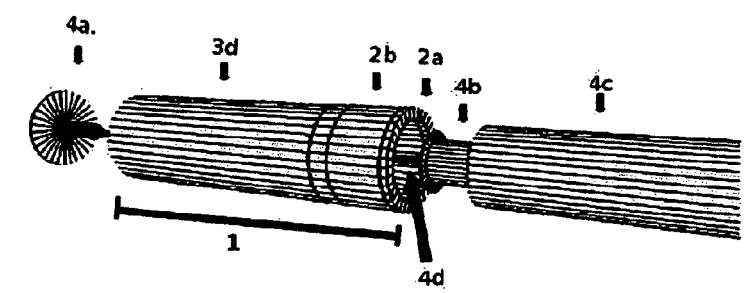

Fig. 3b

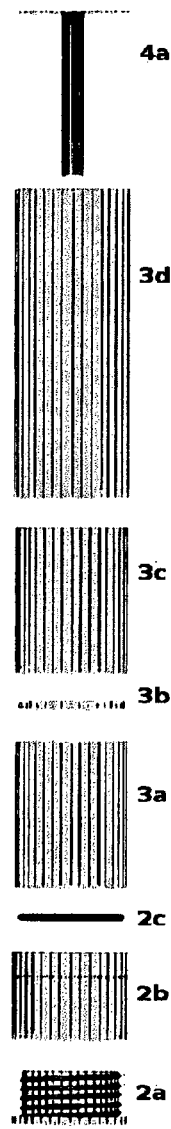

Fig. 3c

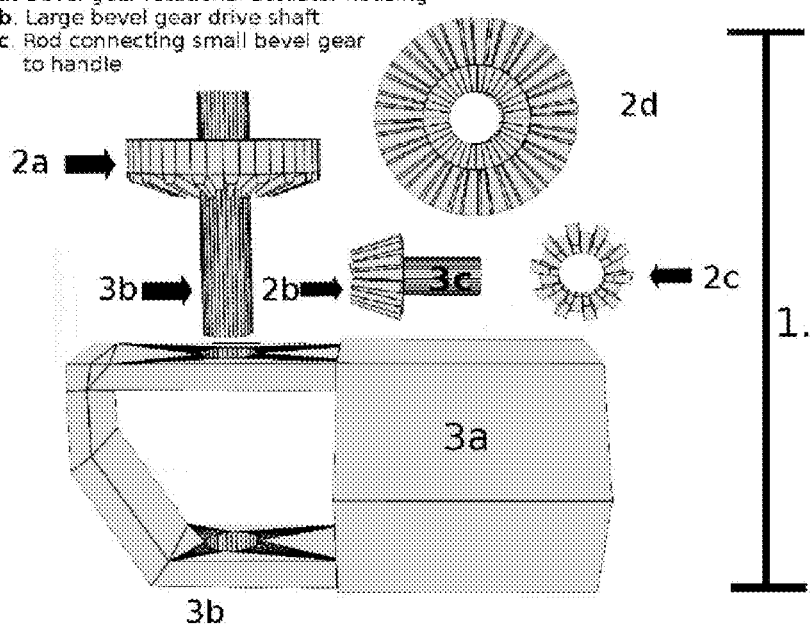

2a. Large Bevel gear (Side View)
2b. Small Bevel Gear (Side View)

3a. Bevel gear rotational actuator housing
3b. Large bevel gear drive shaft 1. Mounting Block
1a. Mounting Screw
1b. O-Ring
1c. Fastenting Screw 2. Camera Mounting Bracket
2a. Mounting Bracket Connector for camera Pan
2b. Mounting Bracket Connector for camera Tilt
2c. Camera attachment screw

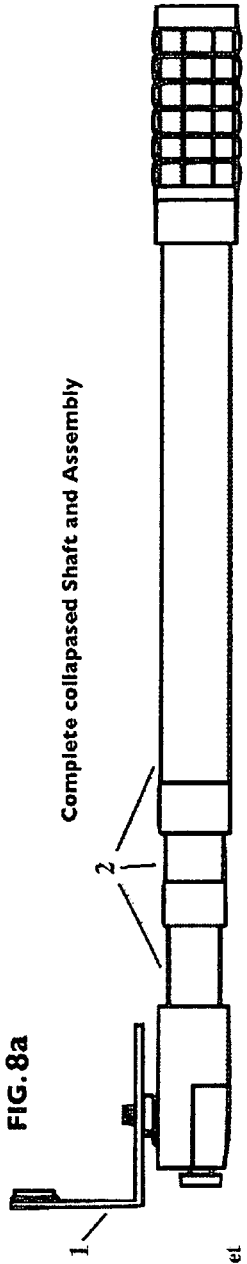
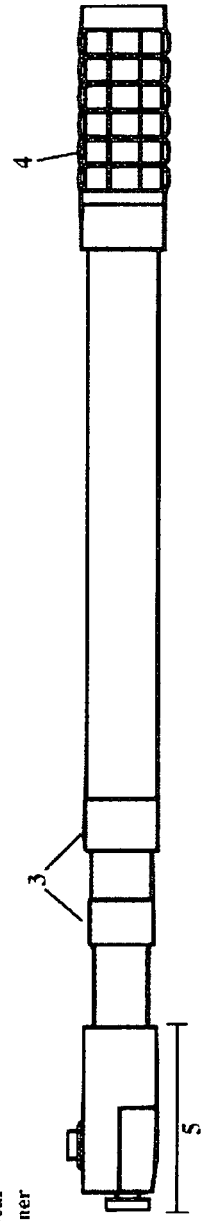
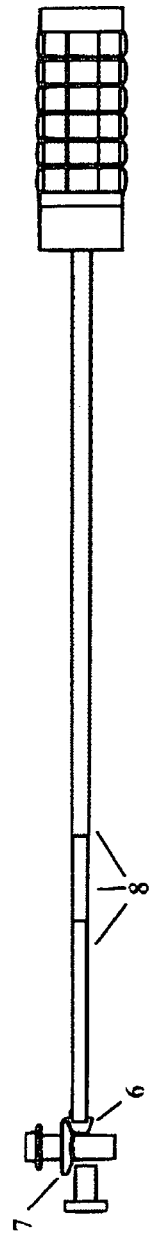
FIG. 8a — Complete collapased Shaft and Assembly
Fig. 8b — Complete collapsed assembly without mount
Fig. 8c — Collapsed assembly with out head unit and telescoping shaft
1. L-Bracket
2. Telescoping Shaft
3. Shaft Clamp Lock
4. Rubber Grip
5. Head Unit
6. Small Bevel Gear
7. Large Bevel Gear
8. Telescoping inner drive rods.

Fig. 9
1. Head unit with full enclosure
2. Main head unit
3. Bottom Enclosure
3a. Bottom enclosure Screws
3b. Bottom enclosure Screw holes
4. Gear Locking Screw
5. Large bevel gear
6. Smal bevel gear
7. Spring (optional)
8. Horizontal shaft hole
9. Vertical shaft hole
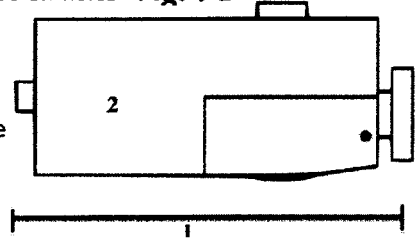
Fig. 9a
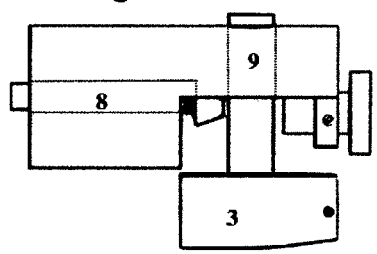
Fig. 9b
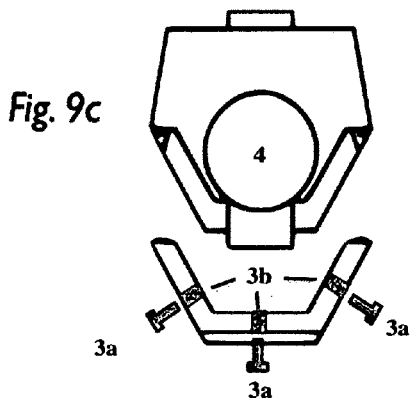
Fig. 9c
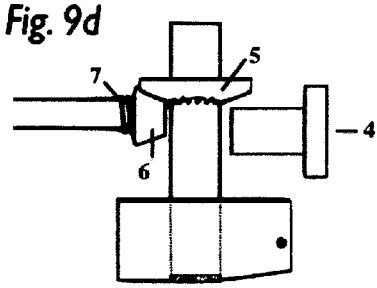
Fig. 9d

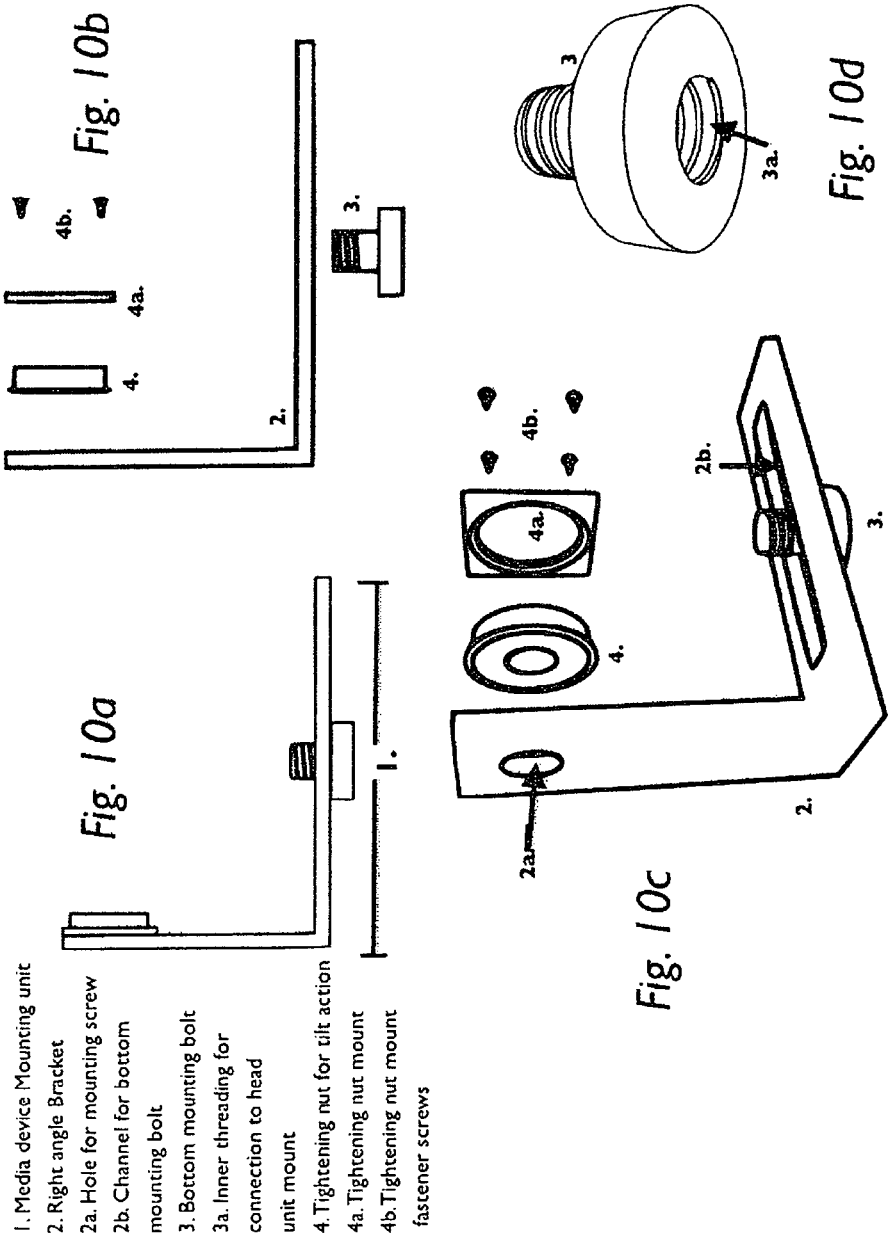

PORTABLE MEDIA EQUIPMENT SUPPORT DEVICE WITH ROTATING ACTION

CROSS-REFERENCE TO RELATED APPLICATIONS

This application claims the benefit of provisional patent application Ser. No. 61/757,338, filed 2013 Jan. 28 by Trenner Law.

BACKGROUND

Prior Art

The following is a tabulation of some prior art that presently appears relevant:

| Pat. No. | Kind Code | U.S. Pat. Issue Date | Patentee |
|---|---|---|---|
| U.S. 8,549,812 | B1 | Oct. 10, 2013 | Hong Fu Jin Precision industry (Shenzhen) co., Ltd. |
| U.S. 327,730 | A | Oct. 6, 1885 | John B. Sims |
| U.S. 20140014807 | A1 | Jan. 16, 2014 | Zeke L. Kamm |

BACKGROUND

Photographers and videographers, among others (e.g., sound technicians) often need to position their equipment where the equipment cannot be readily held. While tripods are commercially available to steady camera equipment, these are typically used for stationary applications (e.g., holding a camera steady for taking a photograph of a sunset, or to avoid shaking Introduced by the user's hands when taking video). There many devices that are used to extend the scope of how said media equipment may be used and positioned. A problem faced with some of these devices is that they can be inconvenient to transport. Also these devices may pose problems to there end user by limiting the range of motion that can be achieved by the media equipment.

Camera Jibs are a support device which do extend the range of a cameras motion. Although camera jibs do serve the end user by allowing for their media equipment to be tilted and moved from a distance, they also have short comings. Camera jibs require a tripod, counter weights, only allow for camera tilting and are generally not easily transportable. For example, US patent 20140014807 (2014) to Zeke L. Kamm, a "Telescoping Portable Camera Jib" is designed to be a compact alternative to a conventional camera jib. Although more portable then previous options, even the current most portable camera jib is cumbersome to transport and requires supplements for use (IE. Tripod and counterweights).

Another device which currently extends the range of media equipment is an adjustable length boom pole. This devices primary function is to hold media equipment at a distance allowing for camera positions that can not be readily held. The boom pole may be used similarly to a camera jib because of its lengthy arm and preferred for its handheld nature. Although more portable then a camera jib, an obstacle of the boom pole is that it can only hold the equipment in a stationary locked position. In most cases the media equipment will either be pointed away from or towards the end user in this locked position. In order to change the media devices orientation, it is necessary for end user to stop, reposition media equipment and re-lock its position before they can engage in using there device again. For this reason using a common boom pole can be troublesome.

ADVANTAGES

With cameras and other media devices becoming smaller and more portable, the same is necessary for the camera jib. The embodiment of my media equipment support device thus differs from a typical camera jib in a few ways to provide for the need for extra portability. Unlike a common camera jib, it is a standalone device, not requiring any supplements for use (such as counterweights, tripods or assembly). Typical camera jibs use a straight push shaft with a lever to control motion tilt of media equipment. This design is limiting to the feasible motion range of the media equipment.

The embodiment of my portable media equipment support device tilting motion is created through the transition of motion via bevel gears. The gears are turned by a drive rod which runs through a shaft that is connected to fully rotational handle. This design is desirable because it allows the end user to continuously rotate said media equipment to the nth degree. Also, because the rotatable handle its allows for end user to conversely rotate shaft while keeping handle stationary. The combination of these actions allow for a wide range of media equipment motions not previously possible.

Therefore, it is desirable for an end user to be able to reposition media device during use. The embodiment of my portable media equipment support device allows the end user to reposition the camera easily and seamlessly during use. For that reason it serves as a beneficial alternative to a boom pole by achieving a similar range for the media equipment while providing the ability to simply reposition said media equipment. Thus, it is necessary to have a portable media equipment support device that can be used as a standalone product with similar results of a camera jib with the portability of a camera boom. It is necessary to a have a product that gives the end user more ways to orient there media device in a portable manner. The device should be lightweight, easily transportable and allow end user to do camera motions not previously accessible.

BRIEF DESCRIPTION OF THE DRAWINGS

FIG. 1 is an illustration of an example media support system, wherein (a) is a side perspective view thereof complete with an example media mounting device in place; (b) is a side perspective view thereof without the example media mounting device in place; and (c) is a side perspective view thereof without either the example media mounting device or hollow shaft in place, thereby allowing an example drive rod to be seen.

FIG. 3 is an illustration of an example rotatable handle associated with the example media support system of FIG. 1, wherein (a) is an exploded, side perspective view thereof; (b) is a partially assembled, side perspective view thereof; and (c) is an exploded, side plan view thereof.

FIG. 8 is an illustration of another example media mounting device having a telescoping shaft and drive rod, wherein is (a) is a side perspective view thereof complete with an example media mounting device in place; (b) is a side perspective view thereof without the example media mounting device in place; (c) is a side perspective view thereof without ether the example media mounting device, hollow shaft or head unit housing in place, thereby allowing an example drive rod and bevel gear system to be seen.

FIG. 9 is an illustration of another example head unit serving as a mounting device rotational actuator where in (a) is a side perspective view thereof complete head unit with full enclosure; (b) is a side perspective view of complete head unit with bottom enclosure and fastener screws thereof revealing inner configuration of small bevel gear, large bevel gear shaft and gear locking screw; (c) is a frontal view of the complete head unit demonstrating positioning of fastener screws, locking screw and bottom enclosure; (d) is a side perspective of head unit with full enclosure without main head unit thereof revealing bottom enclosure, gear locking screw, large gear shaft, large bevel gear, small bevel gear, small gear shaft, fastener screws and spring wherein spring is optional based on tolerance between small bevel gear and main head unit.

FIG. 10 is an illustration of another example media device mounting unit wherein (a) is a front perspective view thereof complete media device mounting unit; (b) is a front perspective view thereof an exploded version of the media device mounting unit showing the right angle bracket, bottom mounting bolt, tightening nut for tilt action, tightening nut mount and tightening nut mount fastener screws wherein fastener screws attach tightening nut mount to right angle bracket there by operably securing tightening nut to right angle bracket; (c) is a perspective view thereof exploded version of media device mounting unit revealing upper circular channel and bottom channel wherein circular channel allows passage for head unit mount and bottom channel allows passage for bottom mounting bolt; (d) is a perspective view of the bottom mounting bolt revealing inner threading for connection to head unit mounting bolt.

DETAILED DESCRIPTION

A long-distance pan or tilt device is disclosed as it may be implemented in an example embodiment as a media support system. The media support system may comprise a hollow shaft having a first shaft end and a second shaft end; a manually rotatable handle operatively mounted relative to the first shaft end; a mounting device rotational actuator operatively mounted to the second shaft end; a drive rod extending through the hollow shaft and operatively linking the rotatable handle with the mounting device rotational actuator; and a media mounting device mounted to the mounting device rotational actuator, the media mounting device being configured for carrying a media element, the media mounting device being operably connected with the mounting device rotational actuator in a manner to facilitate at least one of panning and tilting of the media element carried thereby.

It is noted that the media element may be a still camera or video camera, or any other media element (or other, non-media element) that may benefit by use of the long-distance pan or tilt device.

Before continuing, it is noted that as used herein, the terms "includes" and "including" mean, but is not limited to, "includes" or "including" and "includes at least" or "including at least." The term "based on" means "based on" and "based at least in part on."

Figure 2:
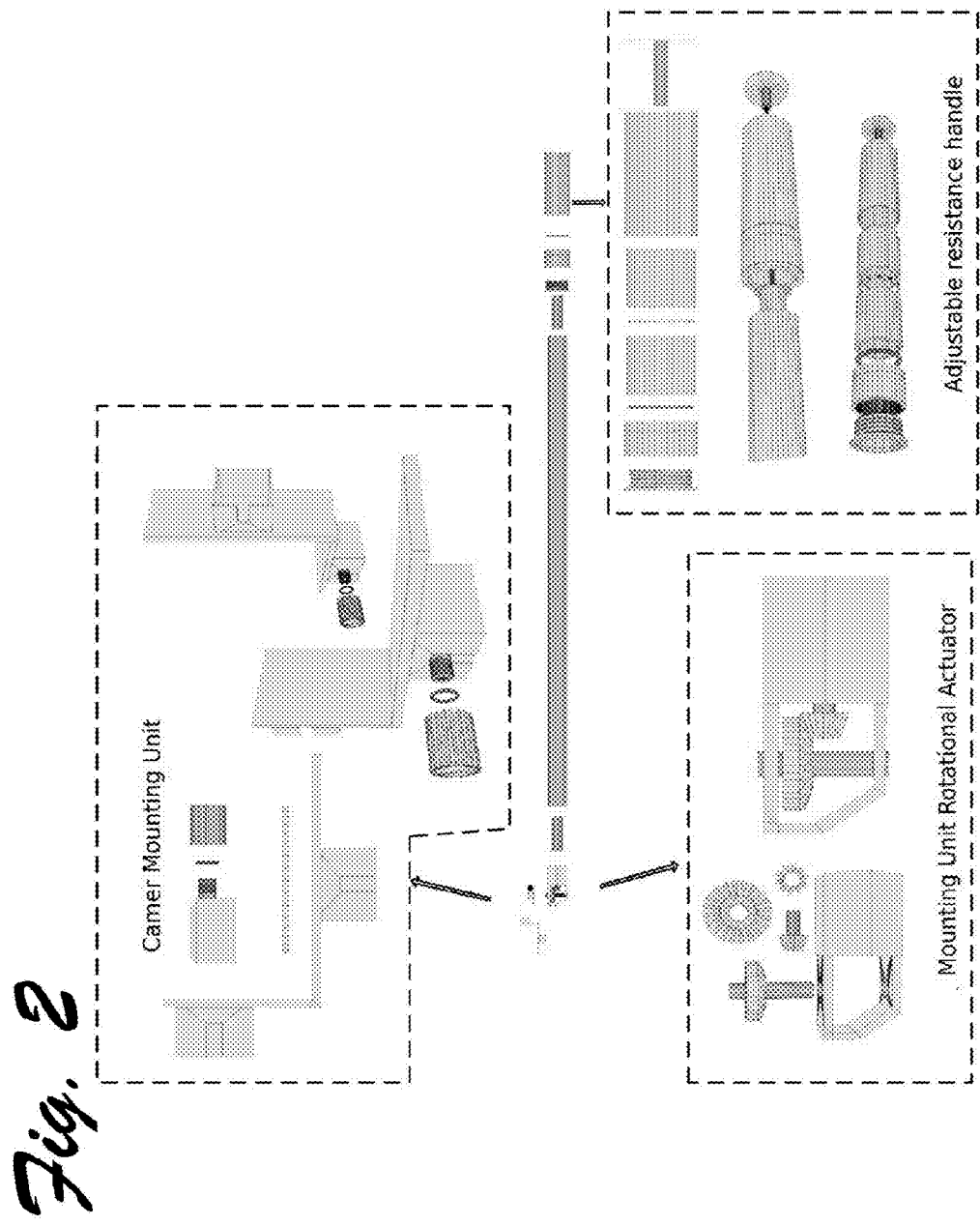
FIG. 2 is an exploded view of the example media support system shown in FIG. 1.

FIGS. 1 and 2 together illustrate an example media support system. The example media support system may include a hollow shaft, a manually rotatable handle, a mounting device rotational actuator, a drive rod, and a media mounting device. The hollow shaft has a first shaft end and a second shaft end. The manually rotatable handle is operatively mounted relative to the first shaft end. The mounting device rotational actuator is operatively mounted to the second shaft end. The drive rod extends through the hollow shaft and operatively links the rotatable handle with the mounting device rotational actuator. The media mounting device is mounted to the mounting device rotational actuator, and the media mounting device is configured for carrying a media element. The media mounting device further is operably connected with the mounting device rotational actuator in a manner to facilitate at least one of panning and tilting of the media element carried thereby. The media support system, allows a user to position, from a distance, a media element carried thereby, for example, a photographic camera, video camera and/or microphone.

FIGS. 3 a-d illustrate of the example rotatable handle. The rotatable handle, in the embodiment shown, is an adjustable resistance handle including a male screw, a resistance adjusting screw, an O-ring, a first handle rotator, a second handle rotator, a handle rotator stopper, a grip sleeve, a drive rod connector, a shaft inner cap, and a shaft boom, which together interact with the drive rod.

The male screw attaches to the first shaft end. The resistance adjusting screw is female to the male screw and provides a handle O-ring housing for the handle O-ring. The resistance adjusting screw feature of the handle allows for adjustable resistance, which allows the user to control the rotational resistance of the handle grip.

The first and second handle rotators permit manual rotational drive energy to be transferred to the drive rod and ultimately to the rest of the system. The handle rotator stopper prevents the first and second handle rotators and/or the grip sleeve from moving laterally along the drive rod while still allowing rotation of such members. The grip sleeve slides over the first and second handle rotators and the handle rotator stopper and attaches to the first and second handle rotators.

The drive rod connector also serves as a handle end cap and connects to both the drive rod and the grip sleeve. The shaft inner cap further acts as a drive rod guide. Together, these multiple components connect the handle to the shaft and are assembled in such a way that secures the handle system but allows for the free rotation of the handle grip and transfer of that rotational motion to the drive rod.

Figure 4B:
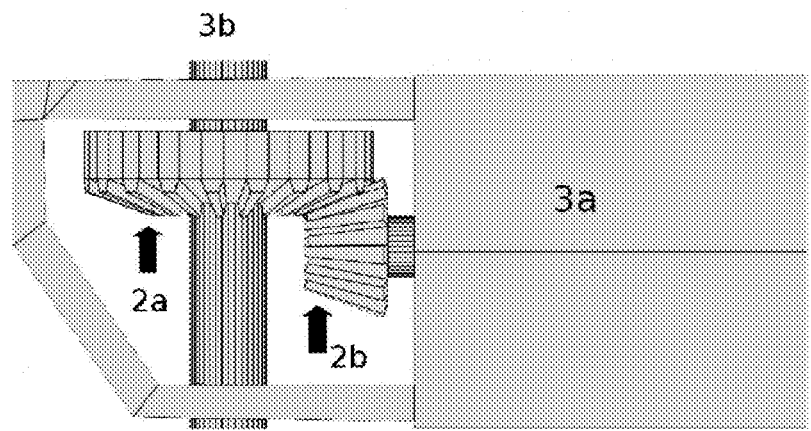
FIG. 4 is an illustration of an example mounting device rotational actuator assembly of the example media support system shown in FIG. 1, wherein (a) is an exploded, side perspective view thereof; and (b) is an assembled, side perspective view thereof.
Figure 5A:
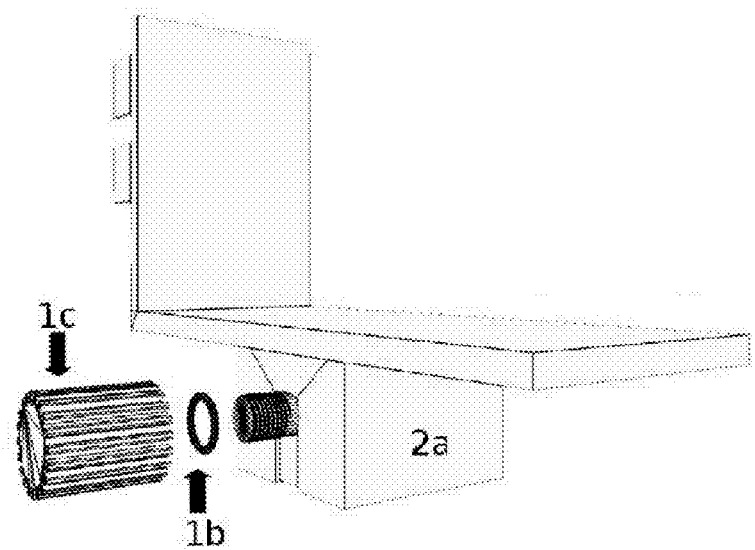
FIG. 5 is an illustration of the example media mounting device and example subcomponents thereof, wherein (a) is a first exploded, perspective view thereof; (b) is a second exploded, perspective view thereof; (c) is a side, exploded view of the media mounting device; and (d) is a side pan view of an example camera/media mounting bracket of the media mounting device.
Figure 5B:
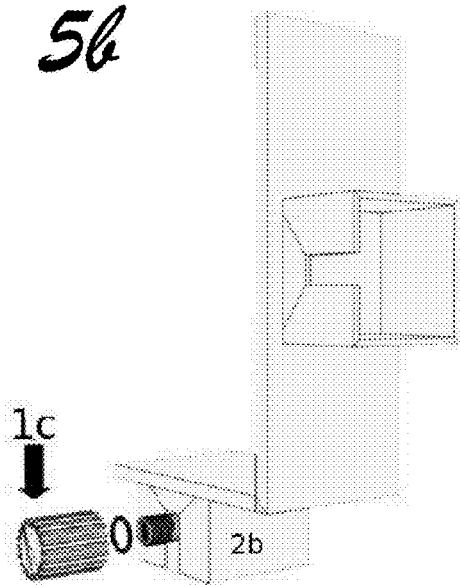
Figure 6A:
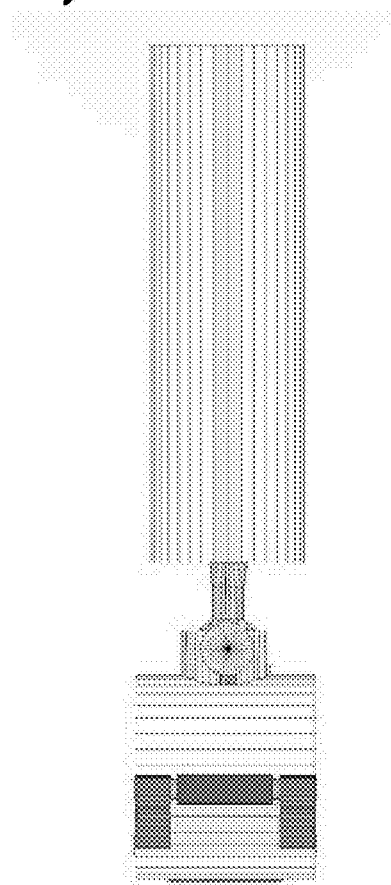
FIG. 6 is an illustration of an example handle attachment for the media mounting device having, wherein (a) is a side view of the handle attachment, (b) is a front view of the handle attachment, (c) is a front view of the handle attachment with a fastener in an open position, and (d)-(e) are close-up views of the handle attachment illustrating opening (and closing) of the fastener.
Figure 6B:
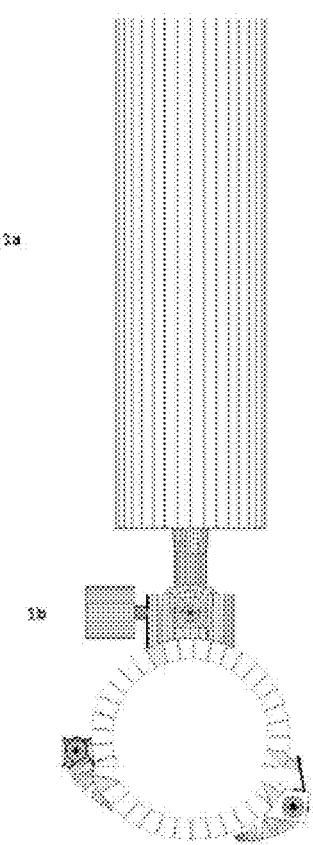
Figure 6C:
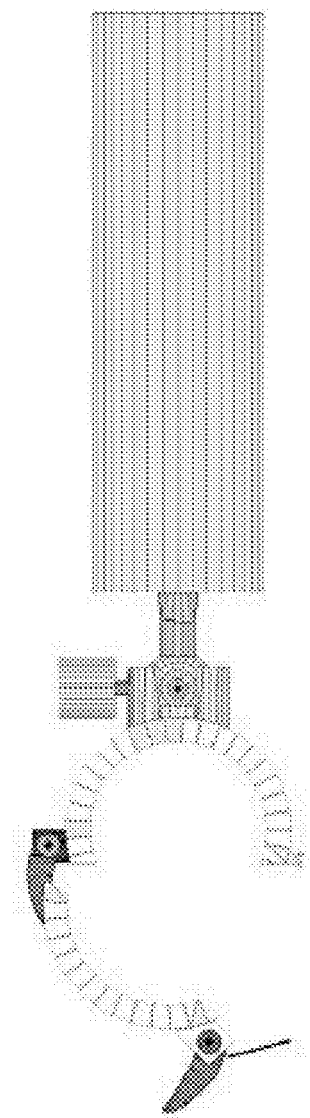
Figure 6E:
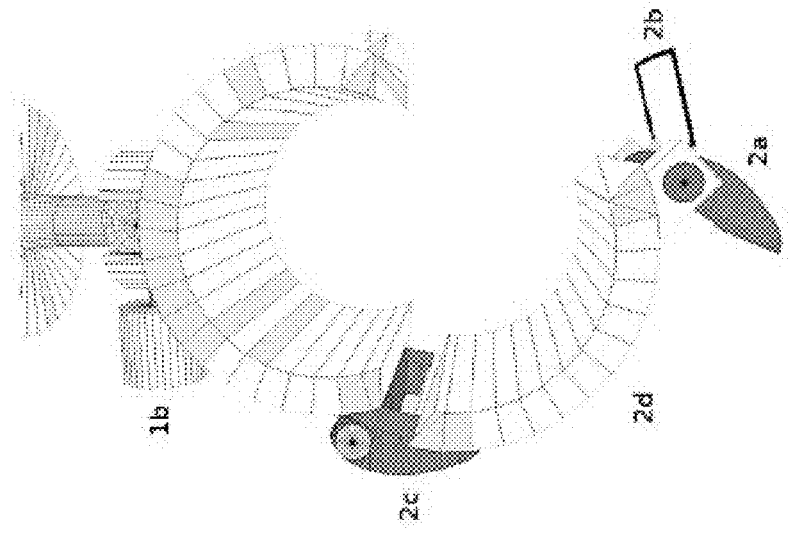
Figure 6D:
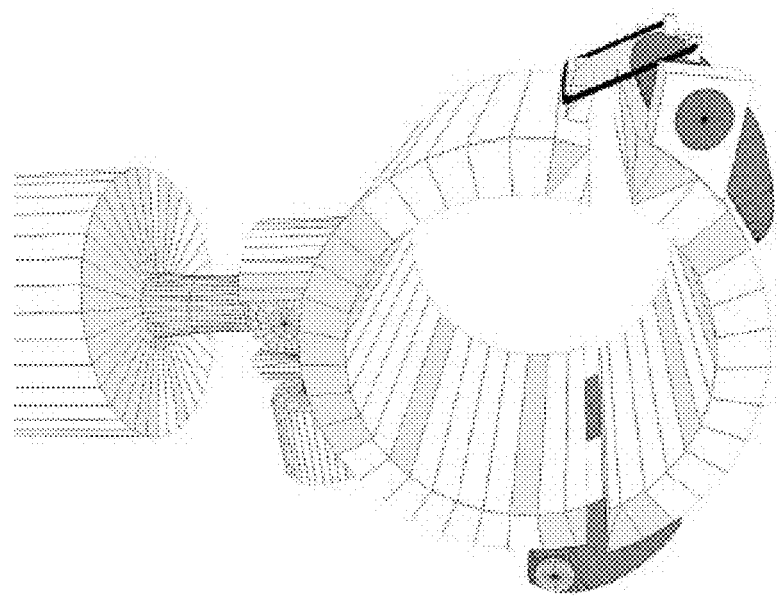

The positioning of the media element may be controlled manually using the rotatable handle at one end of the device (e.g., at the first shaft end), which controls the rotation of actuator gear elements (as illustrated in FIGS. 4a-b) in the mounting device rotational actuator and, by connection, mounting gear elements (as shown in FIGS. 5a-c) of the mounting device at the opposite end (e.g., at the second shaft end).

The mounting device and handle may be connected by the shaft, which can be one of any of a variety of lengths or which can be adjustable (e.g., telescoping and/or retractable, though not expressly shown) to allow for a range of lengths to be achieved. The shaft has a drive rod running through the center thereof, which allows for the transfer of motion between the rotatable handle and the actuator gear elements.

It is understood that the length and/or adjustability of the drive rod can be appropriately sized relative to the shaft and rotatable handle combination in which it functions, so that the drive rod can operably connect the handle and the mounting device rotational actuator.

FIGS. 4a-b illustrate the example mounting device rotational actuator. The mounting device rotational actuator, as illustrated, includes a large bevel gear, a small bevel gear, a bevel gear rotational actuator housing, and a large bevel gear drive shaft, with the small bevel gear being mounted to the drive rod.
The bevel gear rotational actuator housing includes a closed structural portion and an open structural portion. The closed structural portion is one of integral with or connected to a second shaft end of the shaft, and a portion of the drive rod extends there through.

The open structural portion of the bevel gear rotational actuator housing defines an open frame receives the large bevel gear and the small bevel gear therein. The open frame has a pair of opposed drive shaft holes therein through which the large bevel gear drive shaft is rotatable and operably mounted.

FIGS. 5a-d show the example media mounting device. The media mounting device includes a mounting block, a mounting screw, a mounting device O-ring, a fastening screw, a media (e.g., camera/microphone) mounting bracket, a first mounting bracket connector, a second mounting bracket connector, and a media attachment screw.

The mounting block, the mounting screw, the mounting O-ring, and the fastening screw facilitate the translation of the rotational movement of the large bevel gear drive shaft to the media mounting device. The first mounting bracket connector is configured for a panning action, while the second mounting bracket is configured for a tilting action.

The mounting device rotational actuator permits an approximately 90 degree transfer of rotational motion between the drive rod and media mount device. The mounting device rotational actuator can be built to securely connect at the second shaft end of the shaft via the bevel gear rotational actuator housing. The mounting device rotational actuator houses two bevel gears and carries the media element mount.

The media element mount allows for a camera and/or a microphone (or other element) to be secured to the media support system. The first bevel gear is oriented substantially perpendicular or, more particularly, perpendicular to the shaft and the drive rod and is connected to the rotatable handle by the drive rod that runs through the shaft. The second bevel gear is connected to the mounting device parallel to the drive rod. The rotation of the first bevel gear results in a ninety degree translation of motion and rotation into the second bevel gear. The two bevel gears are perpendicular to each other, and the combined pitch of the two gears is made to equal 90 degrees, in the illustrated embodiment. The second bevel gear can then be connected to the media mounting system for the camera and/or the microphone.

An example function of the shaft is to support the handle system, mounting system and house the drive rod which connects the two. The shaft can be made as a straight hollow piece of material (e.g., plastic or aluminum). The shaft may be cylindrical. Of course, other outer and inner shapes may be used to provide appropriate clearance for the full rotation of the drive rod housed therein. For example, the shapes could be triangular, square, pentagonal, hexagonal, octagonal, etc.

The shaft houses the drive rod, and the exact shape of the drive rod may also be varied. It is understood that the drive rod may be a carbon fiber shaft or made of a metal, plastic, or a composite other than carbon fiber.

There are other features (not shown) that may also be incorporated into the media support system. By way of illustration, but not intended to be limiting, the shaft and drive rod may each be retractable and/or length-adjustable. Various types of media mount blocks for orienting the media element may be utilized, including, for example, a collapsible block and/or a pivotable block, the latter providing for yet a further degree of orientation. Further, the mounting device rotational actuator may instead be provided with miter gears or spiral bevel gears. Additionally, the shaft and rotational
actuator housing may be of a uni-body construction. A second grip attachment for connection to the shaft (e.g., in the midsection thereof) may also be provided for greater handling stability.

FIG. 6 is an illustration of an example handle attachment for the media mounting device having, wherein (a) is a side view of the handle attachment, (b) is a front view of the handle attachment, (c) is a front view of the handle attachment with a fastener in an open position, and (d)-(e) are close-up views of the handle attachment illustrating opening (and closing) of the fastener. In FIG. 6, the following references are used: handle 1a, tightening screw 1b, locking lever 2a, locking fastener 2b, pivoting joint device 2c, and bottom bracket 2d.

The example handle attachment may be provided as a component of which can be used to provide a user with extra support when holding the media mounting device. The handle may attach at any point on the shaft which the user desires. The handle orientation can be adjusted via a ball joint and screw that tightens on to the ball joint. The handle can be connected to the media mounting device by a shaft mounting clamp. The clamp may include a top piece and bottom piece. The top piece primarily functions to house the ball joint and secure the handle to the rest of the attachment. The bottom piece may include a hinge, bottom connecting bracket, and locking lever. The hinge allows the bottom piece to pivot open, so that the attachment can fit around the shaft. The bottom connecting bracket can be used to connect the hinge and locking lever. The locking lever may include a lever which, when set to the closed position fastens a swing arm to a hook located on the upper piece. This can serve to fasten or remove the attachment depending on if the lever is open or closed.

While a specific example of the handle attachment is shown and described in the drawings, it is understood that variations will be readily apparent to those having ordinary skill in the art after becoming familiar with the teachings herein, and are also contemplated to be a part of the disclosure herein.

Figure 7A:
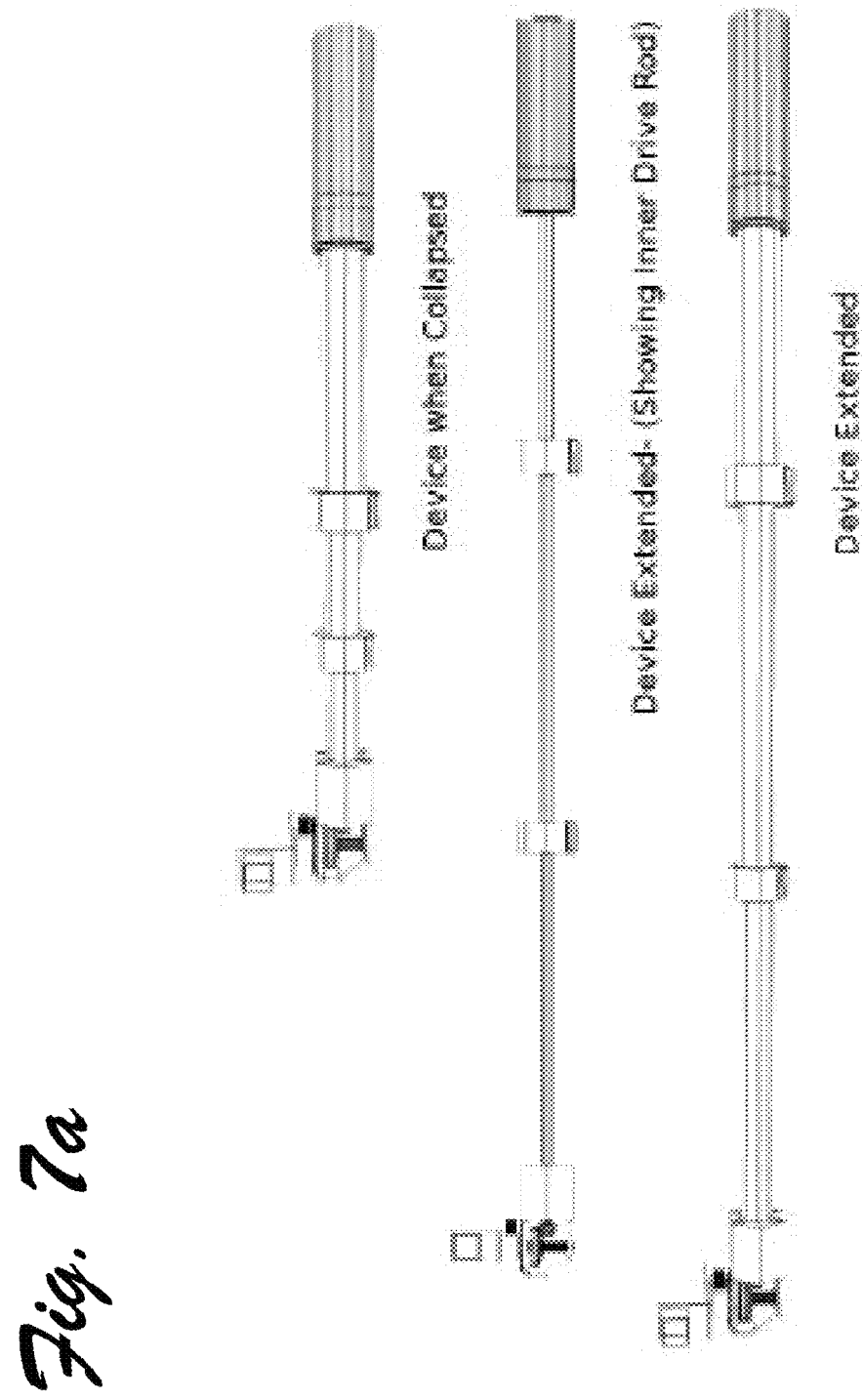
FIG. 7 is an illustration of another example media mounting device having a telescoping shaft, wherein (a) is a side view illustrating collapsing and extending the telescoping shaft, (b) is a front view illustrating a fastener for securing the telescoping shaft at various extension lengths, and (c) are side perspective and front views of the telescoping shaft.
Figure 7B:
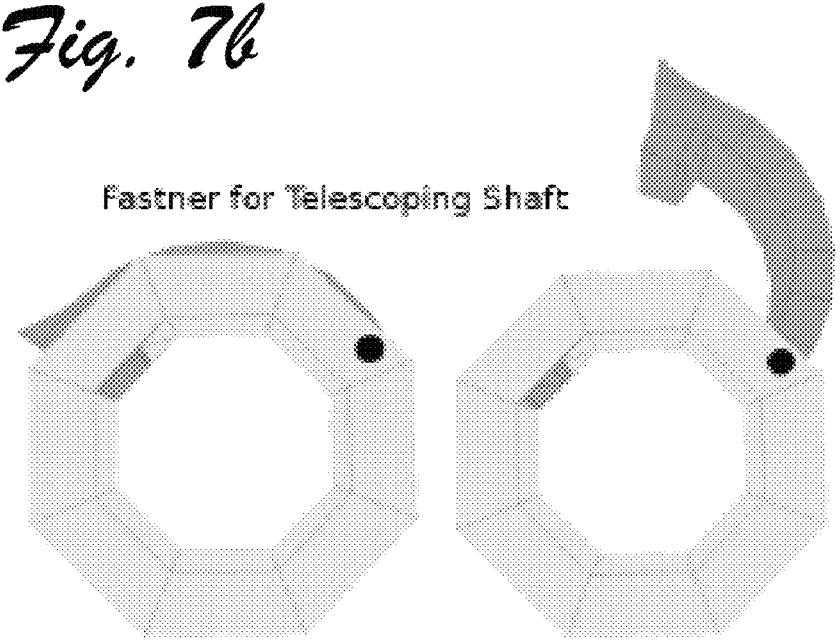
Figure 7C:
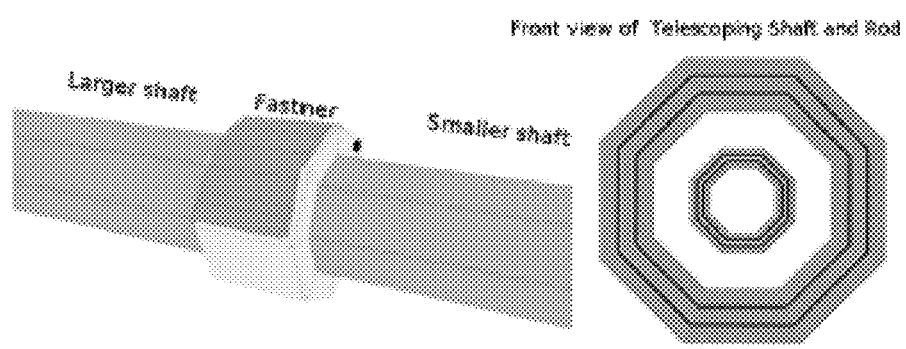

FIG. 7 is an illustration of another example media mounting device having a telescoping shaft, wherein (a) is a side view illustrating collapsing and extending the telescoping shaft, (b) is a front view illustrating a fastener for securing the telescoping shaft at various extension lengths, and (c) are side perspective and front views of the telescoping shaft.

The example telescoping shaft allows the shaft of the media mounting device to be extended. The telescoping shaft may include at least two separate hollow shafts that fit into one another as shown. The inner diameter of one shaft may be slightly larger than the outer diameter of the next, and so forth. A locking mechanism may be attached at an end of each shaft segment to lock and release one shaft from the next. This configuration allows for a length of the entire shaft to be easily adjustable to various sizes.

While a specific example of the telescoping shaft is shown and described in the drawings, it is understood that variations will be readily apparent to those having ordinary skill in the art after becoming familiar with the teachings herein, and are also contemplated to be a part of the disclosure herein.

FIG. 8 is an illustration of another example media mounting device having a telescoping shaft and drive rod, wherein is (a) is a side perspective view thereof complete with an example media mounting device in place; (b) is a side perspective view thereof without the example media mounting device in place; (c) is a side perspective view thereof without either the example media mounting device, hollow shaft or head unit housing in place, thereby allowing an example drive rod and bevel gear system to be seen.

The example media support system with a telescoping shaft and drive rod may include a hollow telescoping shaft, a manually rotatable handle, a head unit housing, a telescoping drive rod, a media mounting device. The hollow telescoping shaft has a first shaft end and a second shaft end. The manually rotatable handle is operatively mounted relative to the first shaft end. The drive rod extends through the hollow shaft and operatively links the rotatable handle with the bevel gear system and thereof head unit housing. The head unit housing is operatively mounted to the second shaft end. The head unit housing encloses and supports the bevel gear system. The media mounting device is mounted to the bevel gear system and is configured for carrying a media element. The media mounting device further is operably supported by the head unit housing and connected by the bevel gear system in a manner to facilitate at least one of panning and tilting of the media element carried thereby. The media support system, allows a user to position, from a distance, a media element carried thereby, for example, a photographic camera, video camera and/or microphone.

While a specific example of the media support system with telescoping shaft is shown and described in the drawings, it is understood that variations will be readily apparent to those having ordinary skill in the art after becoming familiar with the teachings herein, and are also contemplated to be a part of the disclosure herein.

FIG. 9 is an illustration of another example head unit serving as a mounting device rotational actuator. The mounting device rotational actuator, as illustrated, includes main head unit, bottom enclosure, gear locking screw, large gear shaft with large bevel gear being mounted to shaft, small bevel gear thereby connected to small gear shaft, spring and fastener screws.

The example main head unit serves to support small bevel gear and shaft and large bevel gear and shaft. The small bevel gear and shaft are operably connected through a drive shaft hole on the horizontal axis of said head unit. The large bevel gear and shaft are operably connected through a drive shaft hole on the vertical axis relative to said head unit. The small bevel gear and large bevel gear are operably connected in an approximate 90 degree deviation thereby producing an approximately 90 degree translation of motion. The gear Socking screw is operably connected through a threaded hole on the frontmost portion of the main head unit. As a result of said locking screw being turned, contact between locking screw and large shaft can be adjusted. Thereof extending the ability to lock the bevel gear system and thereby rotatability of large shaft.

The bottom enclosure is secured to the main head unit by no less than one fastener screw. Large shaft is operably attached through a drive shaft hole located at of bottom enclosure. Thereafter enclosing the large gear and small gear and securing large gear shaft. It will be noted that the bottom enclosure drive shaft holes It will be noted that in FIG. 9c. An optional spring is shown. The spring is fitted around the small gear shaft between the main head unit and small bevel gear. This particular design would be used in specific cases whereon the tolerances of the gears created irregularities in gear teeth. The spring acts to force the small and large bevel gears to keep even contact.

FIG. 10 is an illustration of another example media device mounting unit. The mounting device may include a right angle bracket, bottom mounting bolt, tightening nut for tilt action, tightening nut mount and fastener screws. The right angle bracket encompasses a hole for mounting screw and bottom channel for mounting bolt. The hole for mounting screw allows for the drive shaft (FIG. 9) to be secured to tightening nut for tilt action. The tightening nut is enclosed by the tightening nut mount and secured to the bracket with fastener screws. The nut mount operably connects the tightening nut to the bracket, allowing for the tightening nut to rotate.

The bottom of the bracket contains a channel for bottom mounting bolt. The bottom mounting bolt contains both an external threading as well as an internal threading within the head of the bolt. The bottom mounting bolt is connected through said channel and fastened to a media equipment device. The bottom mounting bolt is operably connected for lateral movement within said channel. This allows for media equipment of various embodiments to be secured to media device mounting unit.

While a specific example of the media mounting device is shown and described in the drawings, it is understood that variations will be readily apparent to those having ordinary skill in the art after becoming familiar with the teachings herein, and are also contemplated to be a part of the disclosure herein.

It is noted that the examples shown and described are provided for purposes of illustration and are not intended to be limiting. Still other examples are also contemplated.

The invention claimed is:

1. A media support system, comprising:
  a telescoping hollow shaft having a first shaft end and a second shaft end; said telescoping hollow shaft comprising at least two separate hollow shaft segments that fit into one;
  a manually rotatable handle operatively mounted relative to the first shaft end; said manually rotatable handle comprising: at least one handle rotator, a grip sleeve attached over the handle rotator;
  a mounting device rotational actuator operatively mounted to the second shaft end; said mounting device rotational actuator comprising a main head unit, and a bottom enclosure secured to said main head unit by at least one fastener screw;
  a telescoping drive rod extending through the telescoping hollow shaft, said telescoping drive rod having a first drive rod end operatively linked to the rotatable handle by a drive rod connector, and a second drive rod end operatively linked with the mounting device rotational actuator;

said main head unit comprising: a first horizontal drive shaft hole supporting a shaft of a small bevel gear operably connected to the drive rod, a second vertical drive shaft hole supporting a shaft of a large bevel gear, the small and large bevel gears being operably connected in an approximate 90 degree deviation, a threaded hole located on the frontmost portion of the main head unit, said threaded hole supporting a gear locking screw, and a spring fitted around the small bevel gear shaft between the main head unit and the small bevel gear;

a media mounting device mounted to the large bevel gear shaft of the mounting device rotational actuator in either a panning or tilting arrangement, the media mounting device being configured for carrying a media element in either of said arrangements, said media mounting device comprising: a right angle bracket having an upper mounting screw hole with a tightening nut and a bottom mounting bolt channel with a bottom mounting bolt for fastening to said media element, said bottom mounting bolt being operably connected for lateral movement within said bottom mounting bolt channel and having a shaft with external threading and a head with internal threading;

wherein when said media mounting device is in said panning arrangement, said bottom mounting bolt is secured to said large bevel gear shaft by said internal threading; and wherein when said media mounting device is in said tilting arrangement, said tightening nut secures said large bevel gear shaft to said upper mounting screw hole.

2. The media support system of claim 1, wherein the telescoping hollow shaft is configured to allow full rotational clearance for the telescoping drive rod housed therein.

3. The media support system of claim 1, wherein the small and large bevel gears can optionally be locked in order to seize the panning and tilting of the media element by the turning of said locking screw, which allows for adjustable contact between the locking screw and the large bevel gear shaft.

4. The media support system of claim 1, wherein the media mounting device can be optionally configured for a panning or tilting motion.

* * * * *